(12) United States Patent
Honda (10) Patent No.: US 7,450,313 B2
(45) Date of Patent: Nov. 11, 2008

(54) SCANNING LENS MOLDED FROM RESIN AND METHOD OF POSITIONING A SCANNING LENS

(75) Inventor: Satoru Honda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 124 days.

(21) Appl. No.: 11/029,623

(22) Filed: Jan. 6, 2005

(65) Prior Publication Data
US 2005/0152045 A1  Jul. 14, 2005

(30) Foreign Application Priority Data
Jan. 7, 2004  (JP) .......................... P2004-001720

(51) Int. Cl.
*G02B 3/00* (2006.01)
*G02B 9/00* (2006.01)

(52) U.S. Cl. ................. 359/662; 359/205; 359/206; 359/642

(58) Field of Classification Search .......... 359/662
See application file for complete search history.

(56) References Cited

U.S. PATENT DOCUMENTS 5,581,391 A * 12/1996 Uzuki et al. ............... 359/205
5,902,993 A * 5/1999 Okushiba et al. .......... 250/208.1
6,778,202 B1 * 8/2004 Shiraishi et al. ........... 347/241
6,785,030 B2 * 8/2004 Ishihara .................... 359/212
6,982,833 B2 * 1/2006 Nemoto .................... 359/626

FOREIGN PATENT DOCUMENTS

JP      09-329755       12/1997
JP      2001-103248 A   4/2001

* cited by examiner

Primary Examiner—Jessica T Stultz
(74) Attorney, Agent, or Firm—Pillsbury Winthrop Shaw Pittman, LLP (57) ABSTRACT

A scanning lens is molded from resin. A lens part refracts a light beam which is scanned in a first direction of the lens part. The lens part defines an optical axis orthogonal to the first direction. The first end part is disposed adjacent to the lens part at one end in the first direction. A surface of the first end part defines an elevational difference that is orthogonal to a second direction, which is orthogonal to both the optical axis and the first direction. The elevational difference facilitates positioning of the scanning lens in the second direction.

20 Claims, 9 Drawing Sheets

SCANNING LENS MOLDED FROM RESIN AND METHOD OF POSITIONING A SCANNING LENS

CROSS REFERENCE TO RELATED APPLICATIONS

This application is based upon and claims the benefit of priority from the prior Japanese Patent Application No. 2004-001720 filed on Jan. 7, 2004, the entire contents of which are incorporated herein by reference. This application also relates to, but does not claim priority to U.S. patent application No. 20040130800, the entire contents of which also are incorporated herein by reference.

BACKGROUND

1. Field of the Invention

The present invention relates to a scanning lens molded from resin and a method of positioning the scanning lens. In particular, the present invention relates to a scanning lens molded from resin which is positioned easily. The present invention also relates to a method of positioning the scanning lens with ease.

2. Description of Related Art

Figure 12:
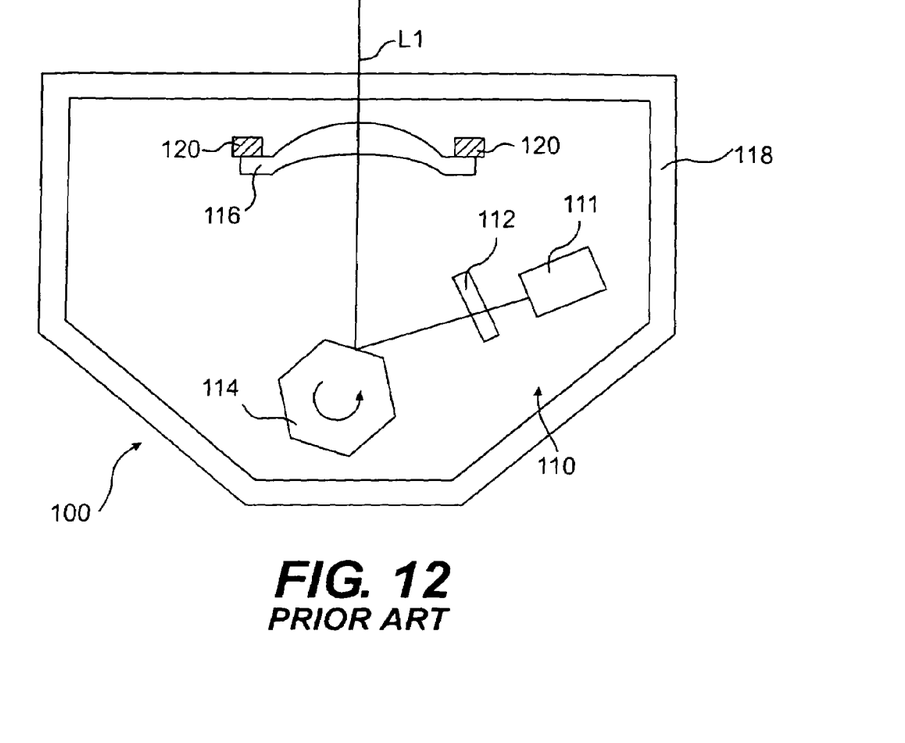
FIG. 12 is a schematic sectional diagram of an optical scanning device according to the prior art.

FIG. 12 shows a schematic plan view of a known optical scanning device 100 such as an electronic copier, a laser beam printer, or a laser facsimile machine.

As shown in FIG. 12, optical scanning device 100 is provided with a light source unit 110, a rotary polygonal mirror 114, and a scanning lens 116.

Light source unit 110 is provided with a light source 111, such as a semiconductor laser, and a collimate lens 112. Rotary polygonal mirror 114 scans a laser beam L1 emitted from light source unit 110. Scanning lens 116 focuses laser beam L1 to form an image on a photosensitive body (not shown) on a rotary drum (not shown) arranged outside of an optical box 118 (at an end point of laser beam L1) while the rotary drum is rotating on its axis. Then, electrostatic latent images are formed on the surface of the rotary drum while polygonal mirror 114 and the rotary drum rotate. Scanning lens 116, which is called as a f-theta lens, corrects distortions of an image which is formed on the photosensitive body on the rotary drum. Scanning lens 116 is an axially asymmetrical aspherical lens and is integrally molded with plastic resin such as PMMA, whose chemical name is polymethylmethacrylate (otherwise known as "acrylic"). As would be appreciated by those skilled in the art, scanning lens 116 must be positioned accurately in order to perform as the f-theta lens.

Figure 13:
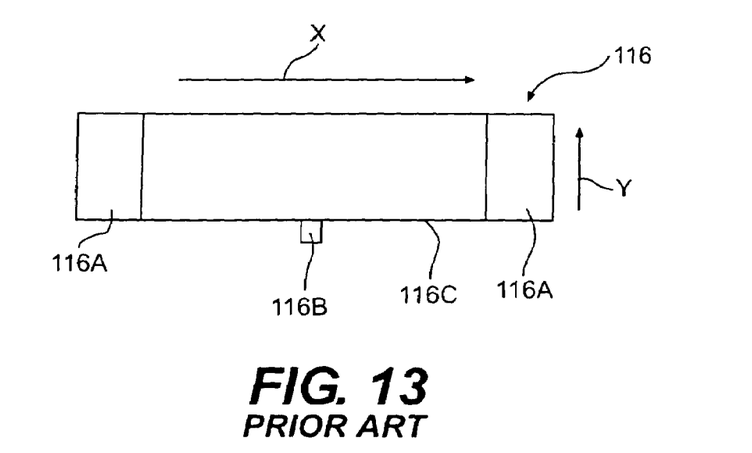
FIG. 13 is a plan view of a known scanning lens.
Figure 14:
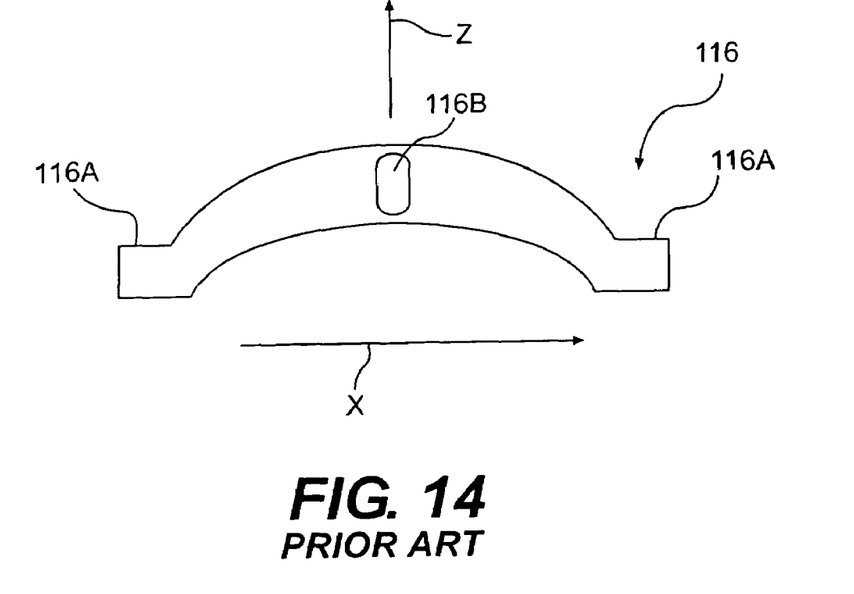
FIG. 14 is a front view of the known scanning lens illustrated in FIG. 13.

A structure of conventional scanning lens 116 is shown in FIGS. 13 and 14.

When positioning scanning lens 116 relative to optical box 118. scanning lens 116 must be positioned properly in at least three directions: (1) a main-scanning direction X (FIG. 13), which corresponds to a direction of the scanning of laser beam L1, (2) an optical-axis direction Z (FIG. 14), which corresponds to a direction of an optical axis of scanning lens 116, and (3) a sub-scanning direction Y (FIG. 13), which is orthogonal to both main-scanning and optical-axis directions X and Z.

In order to position scanning lens 116 in all three of these directions, scanning lens 116 has a plane 116A orthogonal to optical-axis direction Z and a projection 116B extending in sub-scanning direction Y, provided at the center of main-scanning direction X.

Figure 15:
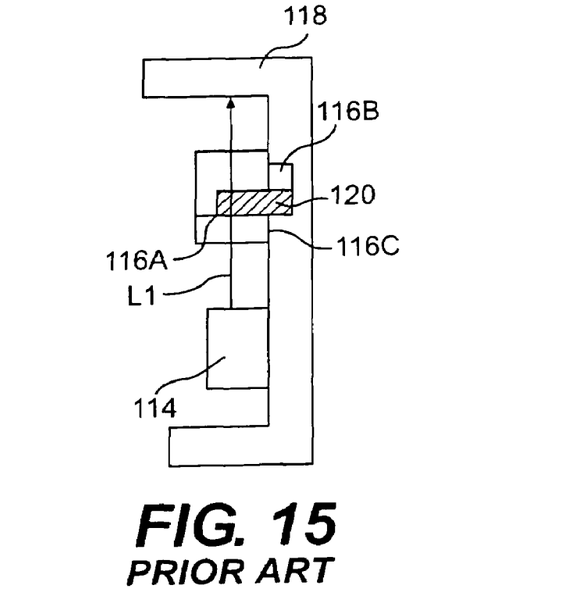
FIG. 15 is a sectional view of the known scanning lens illustrated in FIG. 13, shown positioned in an optical box.

As shown in FIG. 15, when positioning scanning lens 116, an end face 116C of scanning lens 116 is positioned in contact with the bottom face of optical box 118. This permits scanning lens 116 to be positioned in sub-scanning direction Y. To position scanning lens 116 in optical-axis direction Z, plane 116A is placed in contact with a surface of positioning ribs 120 (see FIG. 12) fixed to the bottom face of optical box 118. Finally, projection 116B is fitted into an indentation (not shown) formed on the bottom surface of optical box 118. This permits scanning lens 116 to be positioned in main-scanning direction X.

After the positioning, scanning lens 116 is fixed on the bottom wall of optical box 118 in conventional ways, such as using adhesives or springs.

It is important to position scanning lens 116 in main-scanning direction X, sub-scanning direction Y, and optical-axis direction Z relative to laser beam L1 scanned by rotary polygonal mirror 114 in order to form good images on the photosensitive body.

Figure 16:
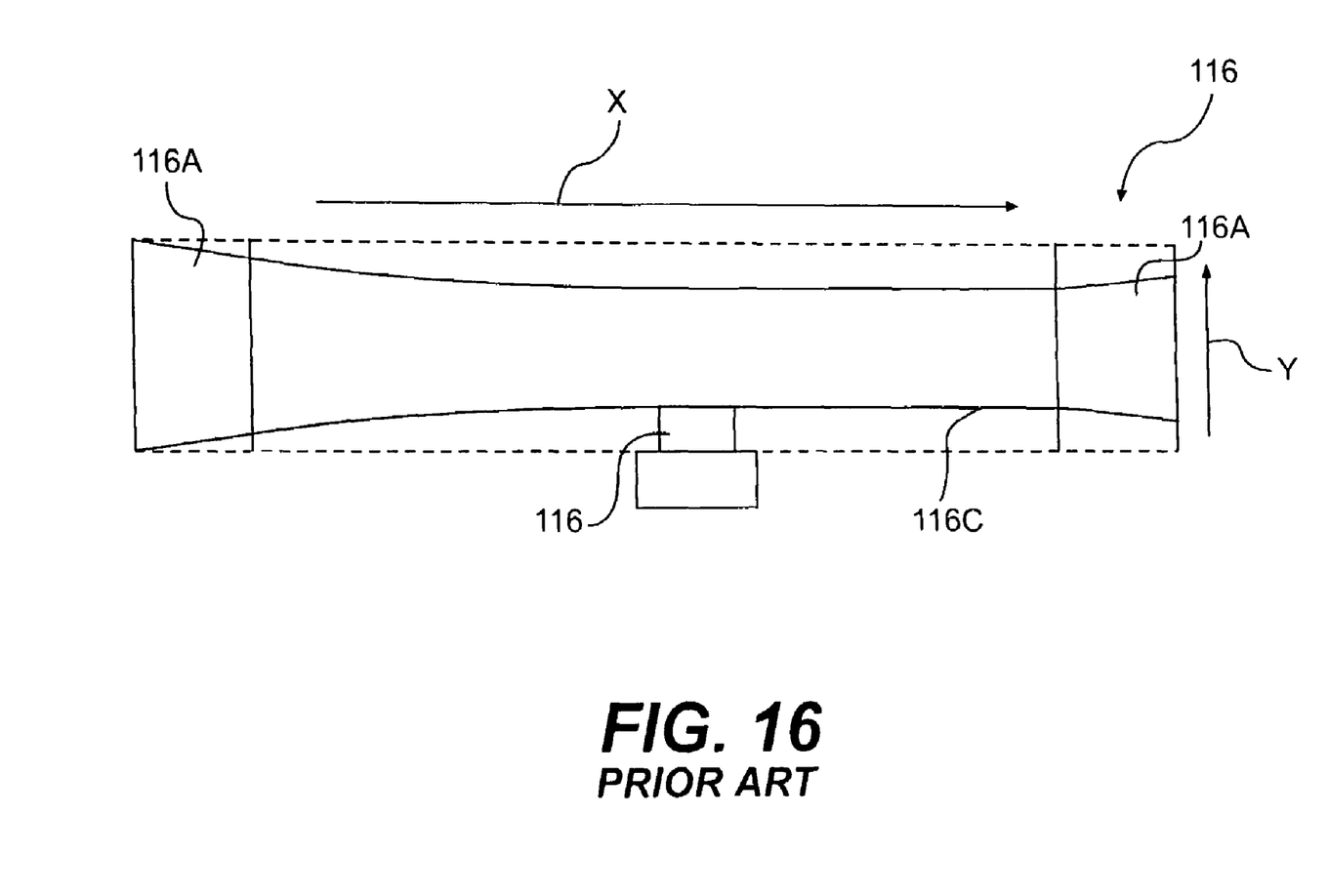
FIG. 16 shows a shape error of the known scanning lens illustrated in FIG. 13, the shape error having been introduced during the molding process.

However, as known to those skilled in the art, the shape of scanning lens 116 may include one or more errors (shape errors), which are introduced during the molding process of scanning lens 116. In detail, as shown in FIG. 16, end face 116C is not manufactured to be parallel with main-scanning direction X because a pressure distribution of the resin in a molding cavity is non-uniform and a temperature of the cavity also is not uniform. These non-uniformities cause the resin to contract in a non-uniform manner. Thus, when end face 116C is aligned with the bottom face of optical box 118, scanning lens 116 will not be parallel with main-scanning direction X. As a result, an image formed on the rotary drum may be distorted.

SUMMARY OF THE INVENTION

Consistent with the present invention, a scanning lens is molded from a resin. The scanning lens is provided with a lens part to refract a light beam which is scanned in a first direction with respect to the lens part. The lens part has an optical axis orthogonal to the first direction. It also includes a first end part provided in the first direction of the lens part. The surface of the first end part includes an elevational difference in a direction orthogonal to a second direction, which is orthogonal to both the optical axis and the first direction. The elevational difference assists in positioning the scanning lens in the second direction.

In another aspect consistent with the present invention, there is a method of positioning the scanning lens. The method comprises contacting the surface of the first end part, where the elevational difference is formed, with a surface of a component fixed to an optical box configured to install a scanning element to scan the light beam. This assists in positioning the scanning lens in the second direction.

BRIEF DESCRIPTION OF THE DRAWINGS

The drawings are intended to illustrate specific embodiments of the invention but are not intended to be limiting of the invention. Other embodiments, consistent with the drawings will be appreciated by those skilled in the art and are intended to fall within the scope of the present invention, as recited by the claims appended hereto. In the drawings, like reference numbers refer to like elements, in which:

DETAILED DESCRIPTION OF EMBODIMENT(S) OF THE INVENTION

In the description that follows, various embodiments of the present invention will be described. In addition, variations of those embodiments also will be described. The present invention, however, is not limited solely to the embodiments or variations described herein. Other embodiments and variations are also intended to be encompassed by the scope of the invention, as would be appreciated by those skilled in the art, and as recited by the claims appended hereto.

A first embodiment of a scanning lens 20, consistent with the present invention, will be explained below with reference to FIGS. 1 to 8.

An optical scanning device to install the scanning lens may have the same structure as that shown in FIG. 12, except for the structure pertinent to the scanning lens. Thus, the reference characters used in the description of the related art are also relevant to this explanation.

Figure 1:
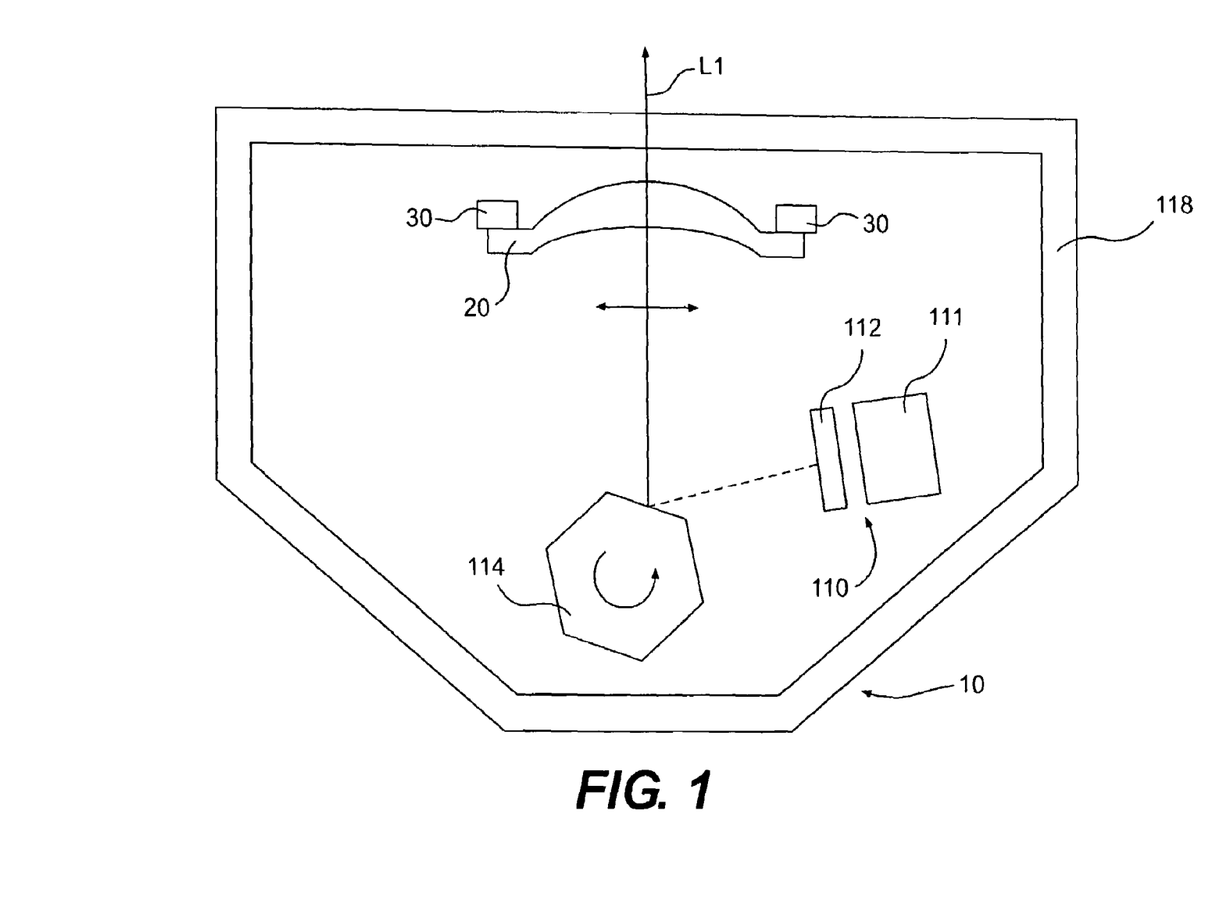
FIG. 1 is a schematic sectional diagram of an optical scanning device according to at least one embodiment of the present invention.

As shown in FIG. 1, an optical scanning device 10 is provided with a light source unit 110, a rotary polygonal mirror 114, and a scanning lens 20.

Light source unit 110 is provided with a light source 111, such as a semiconductor laser, to emit a laser beam L1, and a cylindrical lens 112 to converge laser beam L1 into a linear light beam on a reflecting surface of rotary polygonal mirror 114. As a scanning element, rotary polygonal mirror 114 scans laser beam L1 in a main-scanning direction X by rotating on its axis.

Scanning lens 20 focuses laser beam L1 on a photosensitive body (not shown) of a rotary drum (not shown) arranged outside of an optical box 118 (at an end point of a laser beam L1) while the rotary drum is rotating on its axis. Then, electrostatic latent images are formed on the surface of the rotary drum as rotary polygonal mirror 114 and the rotary drum, respectively, rotate.

Scanning lens 20 serves as a so-called f-theta lens that corrects distortions of an image formed on the photosensitive body. Scanning lens 20 is an axially asymmetrical, aspherical lens and is integrally molded from a plastic resin such as PMMA. Other materials also may be employed to manufacture scanning lens 20, as would be appreciated by those stilled in the art.

Rotary polygonal mirror 114, scanning lens 20, and light source unit 110 are secured and housed, respectively, in optical box 118.

In particular, it is preferred that scanning lens 20 be positioned accurately in the optical path of laser beam L1, which is scanned by polygonal mirror 114. The structure of scanning lens 20 will be explained next.

In this embodiment, a "main-scanning direction" (first direction) corresponds to the direction in which scanning element such as polygonal mirror 114 scans a light beam. The light beam scanned in the main-scanning direction is made incident to scanning lens 20. An "optical-axis direction" of scanning lens 20 corresponds to the direction of an optical axis of scanning lens 20. The optical-axis direction is orthogonal to the main-scanning direction. Furthermore, a "sub-scanning direction" (second direction) refers to the direction that is orthogonal to both the main-scanning and optical-axis directions.

Figure 2:
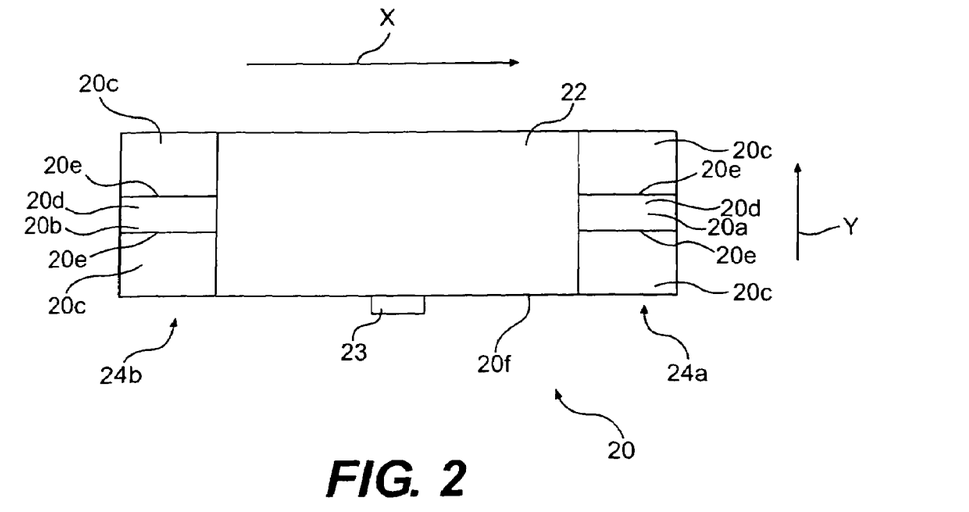
FIG. 2 is a plan view of one embodiment of a scanning lens for the optical scanning device illustrated in FIG. 1.
Figure 3:
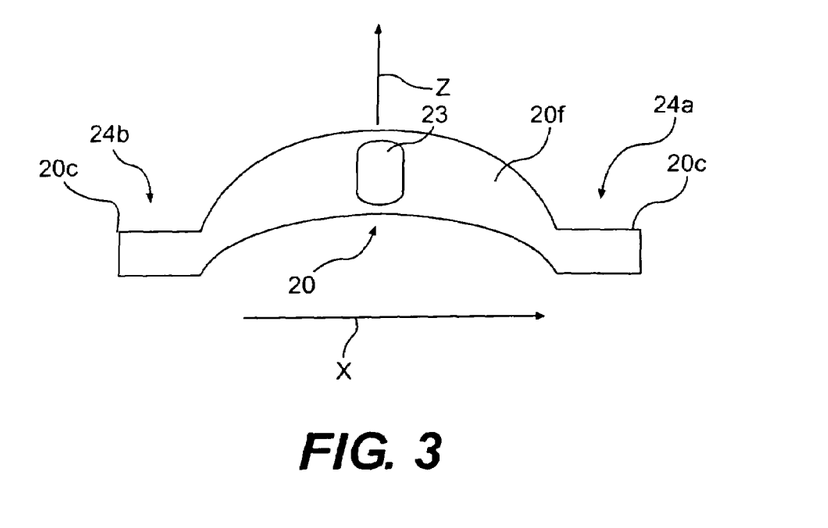
FIG. 3 is a front view of the scanning lens illustrated in FIG. 2.

FIG. 2 is a plan view of scanning lens 20 and FIG. 3 is a front view thereof. The main-scanning direction is expressed by the reference character X in FIGS. 2 and 3. The sub-scanning and the optical-axis directions are respectively shown by the reference characters Y (FIG. 2) and Z (FIG. 3). In addition, a main-scanning axis (not shown) of scanning lens 20 is an axis in parallel with main-scanning direction X. The main-scanning axis of scanning lens 20 passes through the center of the scanning lens 20, in sub-scanning direction Y. An optical axis (not shown) is an axis in parallel with optical-axis direction Z. The optical axis passes through the center of scanning lens 20 both in main-scanning and sub-scanning directions X and Y.

Scanning lens 20 has a pair of end parts, referred to herein as a first end part 24a and a second end part 24b, which are provided at both ends of scanning lens 20 in main-scanning direction X. A lens part 22 is disposed between end parts 24a and 24b. The lens part 22 refracts laser beam L1, which is scanned in main-scanning direction X on a surface of lens part 22. Both end parts 24a and 24b have a plane 20c which is orthogonal to optical-axis direction Z. Scanning lens 20 also includes parts 20a and 20b, which have indentations 20d denting inwardly from each of planes 20c. Thus, end parts 24a and 24b have different elevations, as viewed with reference to optical-axis direction Z, depending upon the portion of end parts 24a and 24b that are examined. Indentations 20d are used to position scanning lens 20 in sub-scanning direction Y.

Indentations 20d are formed at the center, in sub-scanning direction Y, of end parts 24a and 24b. As shown in FIG. 2, indentations 20d extend in main-scanning direction X and each have two walls 20e which extend parallel to main-scanning direction X. A projection 23 is formed on an end face 20f of scanning lens 20. The projection 23 extends outwardly from end face 20f in sub-scanning direction Y.

Scanning lens 20 described above, is produced by a molding process where resin flows through a molding die in main-scanning direction X.

When scanning lens 20 is fixed to optical box 118, scanning lens 20 must be positioned in main-scanning, sub-scanning and optical-axis directions X, Y and Z. In order to position scanning lens 20 in sub-scanning direction Y, indentations 20d with walls 20e are used instead of end face 20f (FIG. 2). The reason for this is explained below.

As explained in the description of the related art (e.g., FIG. 16), scanning lens 20 incorporates a shape error that is caused by the molding process. To be specific, end face 20f does not form as a surface parallel to main-scanning direction X because the degree to which the resin contracts normally increases in main-scanning direction X. Since the deviation increases as the distance from the main-scanning axis increases, the displacement amount (e.g., the shape error) is at its maximum at end face 20f. Understandably, therefore, there is less displacement at positions near to the main-scanning axis. As a result of this shape error, scanning lens 20 may be more accurately positioned in sub-scanning direction Y by using walls 20e rather than using end face 20f. In detail, bringing walls 20e of end parts 24a and 24b in contact with the surfaces of positioning ribs 30 positions scanning lens 20 in sub-scanning direction Y. Preferably, positioning ribs 30 are fixed to the bottom face of optical box 118 before scanning lens 20 is positioned. Alternatively, another component having a surface to contact with one or more of walls 20e may be used in the place of positioning ribs 30.

Figure 4:
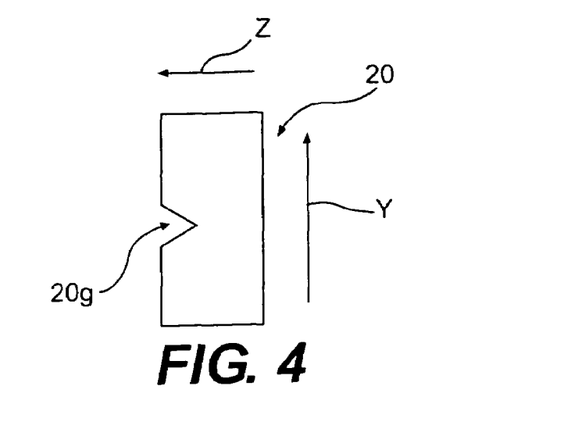
FIG. 4 shows a modification of the scanning lens illustrated in FIG. 2, in which the scanning lens includes a first type of indentation.

Indentations 20 need not have only the shape and form as illustrated in FIGS. 2 and 3. To the contrary, indentations 20d may be modified in any of a plurality of different ways and yet still provide an adequate positioning function. FIG. 4 is a side view of an end face, taken from main-scanning direction X, of a first variation of scanning lens 20. In this variation, an indentation 20g, instead of indentation 20d, forms a triangular channel with walls extending parallel to main-scanning direction X. In this variation, the groove (i.e., the triangular channel) extends in main-scanning direction X on one or both surfaces of end parts 24a or 24b to form the indentation. Of course, as would be appreciated by those skilled in the art, the indentation may take any cross-sectional shape. For example, the indentation may present a cross-section that is semi-circular, elliptical, polygonal, or irregular.

Figure 5:
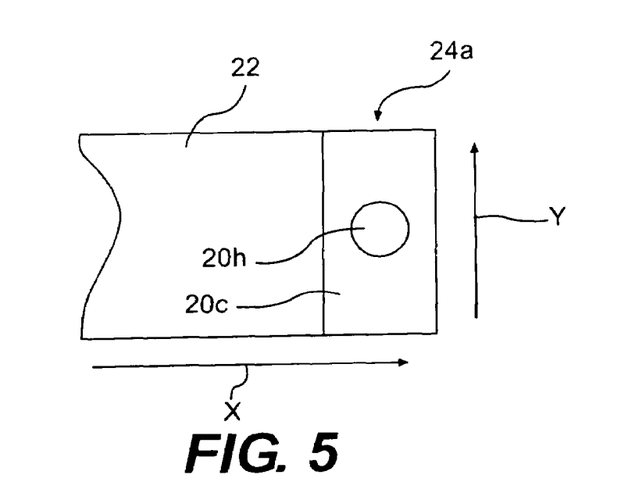
FIG. 5 shows another modification of the scanning lens illustrated in FIG. 2, in which the scanning lens includes a second type of indentation.

Additionally, as would be appreciated by those skilled in the art, the indentation does not need to include a wall that extends parallel to main-scanning direction X. As one example, a partial plan view of scanning lens 20 is shown in FIG. 5. An indentation 20h is shaped as a spherical surface (or partially spherical surface). In order to position scanning lens 20 using indentation 20h, positioning rib 30 should have a projection forming a complementary spherical surface (or partially spherical surface) to fit into (or mate with) indentation 20h. Other shapes for indentation 20h and for complimentary positioning rib 30 are also contemplated to fall within the scope of the present invention. For example, indentation 20h may be cubical, rectilinear, polygonal, spherical, conical, pyramidal, ellipsoidal, amorphous, or the like. As would be appreciated by those skilled in the art, the number of possible permutations is endless.

Further, the indentations may be formed on an end surface of one or both of end parts 24a or 24b instead of the surface facing optical-axis direction Z. In this variation, if there different positions (or heights), taken in a direction orthogonal to sub-scanning direction Y, it is possible to position scanning lens 20 using the different positions. In this case, an indentation that extends in main-scanning direction Z, a groove extending in optical-axis direction Z, or the like may be formed on one or both end faces of end part 24a or 24b.

Figure 6:
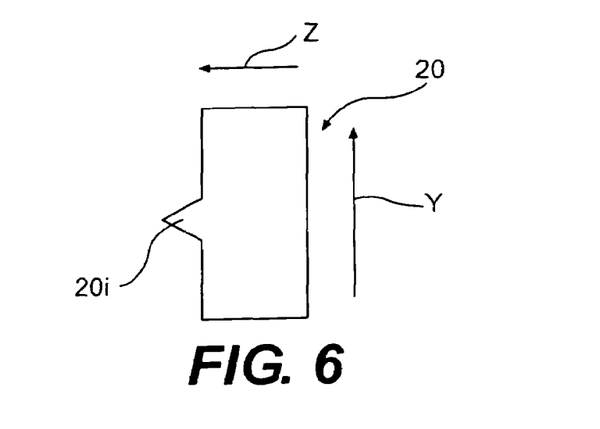
FIG. 6 shows yet another modification of the scanning lens illustrated in FIG. 2, in which the scanning lens includes a first type of projection.

A further modification of the present invention is shown in FIG. 6. This figures illustrates a side view of an end face, taken in main-scanning direction X, of scanning lens 20. Instead of incorporating an indentation into scanning lens 20, a projection 20i that projects from a surface of end part 24a may be used to position scanning lens 20. As discussed above, the cross-sectional shape of projection 20i may be selected from a potentially unlimited variety of potential shapes. For example, projection 20i may have a cross-sectional shape that is hemispherical, elliptical, rectangular, square, polygonal, triangular, conical, amorphous, or the like. Moreover, the three-dimensional shape of projection 20i may be hemispherical, ellipsoidal, rectangular, cubical, polygonal, pyramidal, cylindrical, or the like. As would be appreciated by those skilled in the art, the number of potential different shapes is limitless, so long as the projection 20i assists with positioning scanning lens 20 in sub-scanning direction Y.

Figure 7:
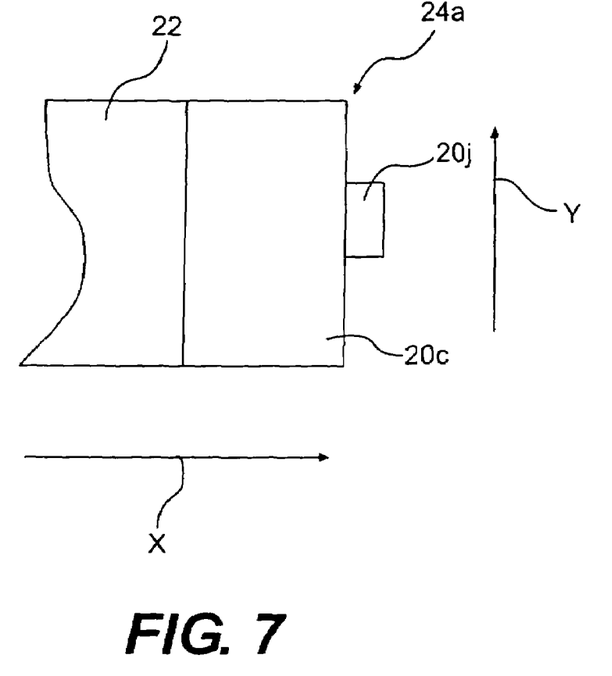
FIG. 7 shows another modification of the scanning lens illustrated in FIG. 2, in which the scanning lens includes a second type of projection.

As shown in FIG. 7, a projection 20j, which projects in main scanning direction Z, may be formed as a part of one or both of the end faces of scanning lens 20. Alternatively, indentations extending on main scanning direction Z may be employed. The cross-sectional shape of projection 20j (or alternatively an indentation) so formed may be any of a limitless variety, as described above and as would be appreciated by those skilled in the art.

In addition to projection 23, another projection or indentation may be formed to position scanning lens 20 in other, different directions. For instance, another end part (a third end part) may be provided in a sub-scanning direction to lens part 22. A surface of the third end part may have different heights (i.e., different elevations) in a direction orthogonal to main-scanning direction X.

Figure 8:
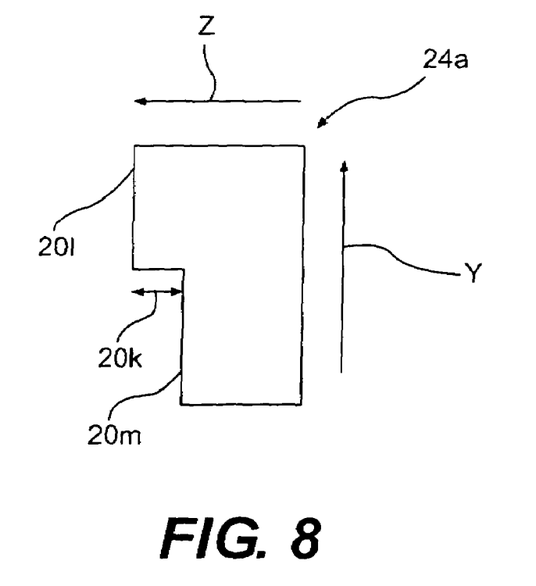
FIG. 8 shows another modification the scanning lens illustrated in FIG. 2, in which the scanning lens includes a step.

FIG. 8 illustrates one embodiment where a step generates different heights or elevations on a surface of one or more of end parts 24a or 24b. In this embodiment, the step is used in place of indentations or projections as discussed above. FIG. 8 shows a side view of an end face, taking in main-scanning direction X, of scanning lens 20. A step 20k is formed by first plane 20l and second plane 20m which are orthogonal to optical-axis direction Z. The height difference between planes 20l and 20m forms the step 20k in optical-axis direction Z.

Figure 9:
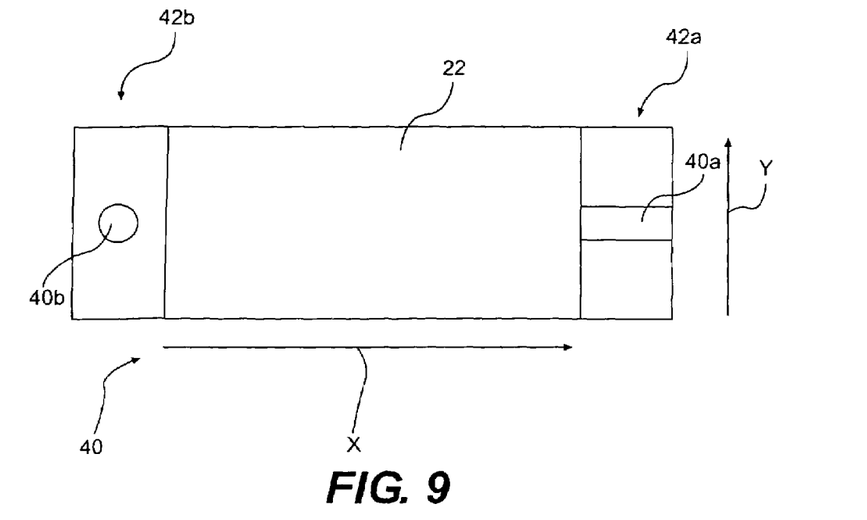
FIG. 9 is a plan view of a second embodiment of the scanning lens of the present invention.
Figure 10:
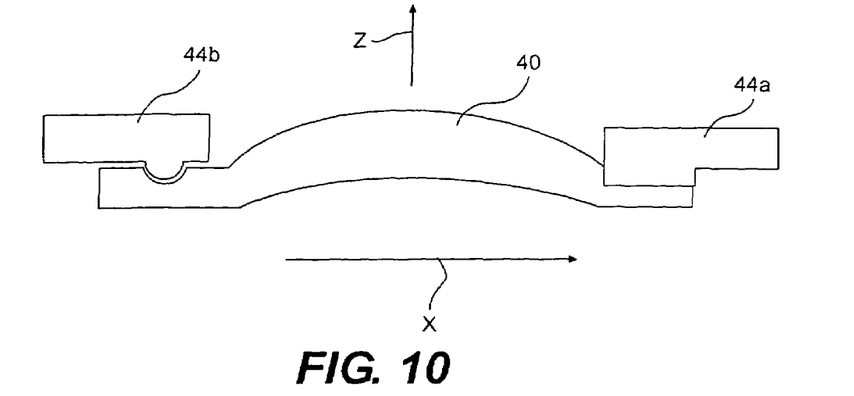
FIG. 10 is a sectional view of the scanning lens illustrated in FIG. 9.

A second embodiment of the present invention is described next. FIG. 9 is a plan view of scanning lens 40. FIG. 10 is a sectional view of scanning lens 40. Scanning lens 40 is secured by positioning ribs 44a and 44b.

Indentation 40a on a surface of an end part 42a forms a groove having walls that runs parallel to main-scanning direction X. Indentation 40b on a surface of end part 42b forms a part of a spherical surface (i.e., less than a sphere). As would be appreciated by those skilled in the art, a partially spherical surface, or part of a spherical surface, is meant to indicate a surface that is less than a complete sphere. Within this disclosure, a partially spherical surface encompasses a hemispherical surface or any portion of a hemispherical surface.

In order to position scanning lens 40, one positioning rib 44b (FIG. 10) is hemispherically shaped (a partially-spherically shaped) to fit into indentation 40b. The other positioning rib 44a is shaped as a rectangular solid to fit within the groove formed by indentation 40a.

Positioning scanning lens 40 in sub-scanning direction Y can be achieved by fitting indentation 40a within positioning rib 44a. Positioning scanning lens 40 in main scanning direction X can be achieved by fining indentation 40b within positioning rib 44b. With this construction, therefore, projection 23 is not needed to position a scanning lens in main-scanning direction X and can be removed altogether.

The modifications shown in the first embodiment are also applicable to this embodiment. For example, indentation 40b may form a partial surface of an ellipsoid or the like while indentation 40a may have a cubical shape or the like.

Figure 11:
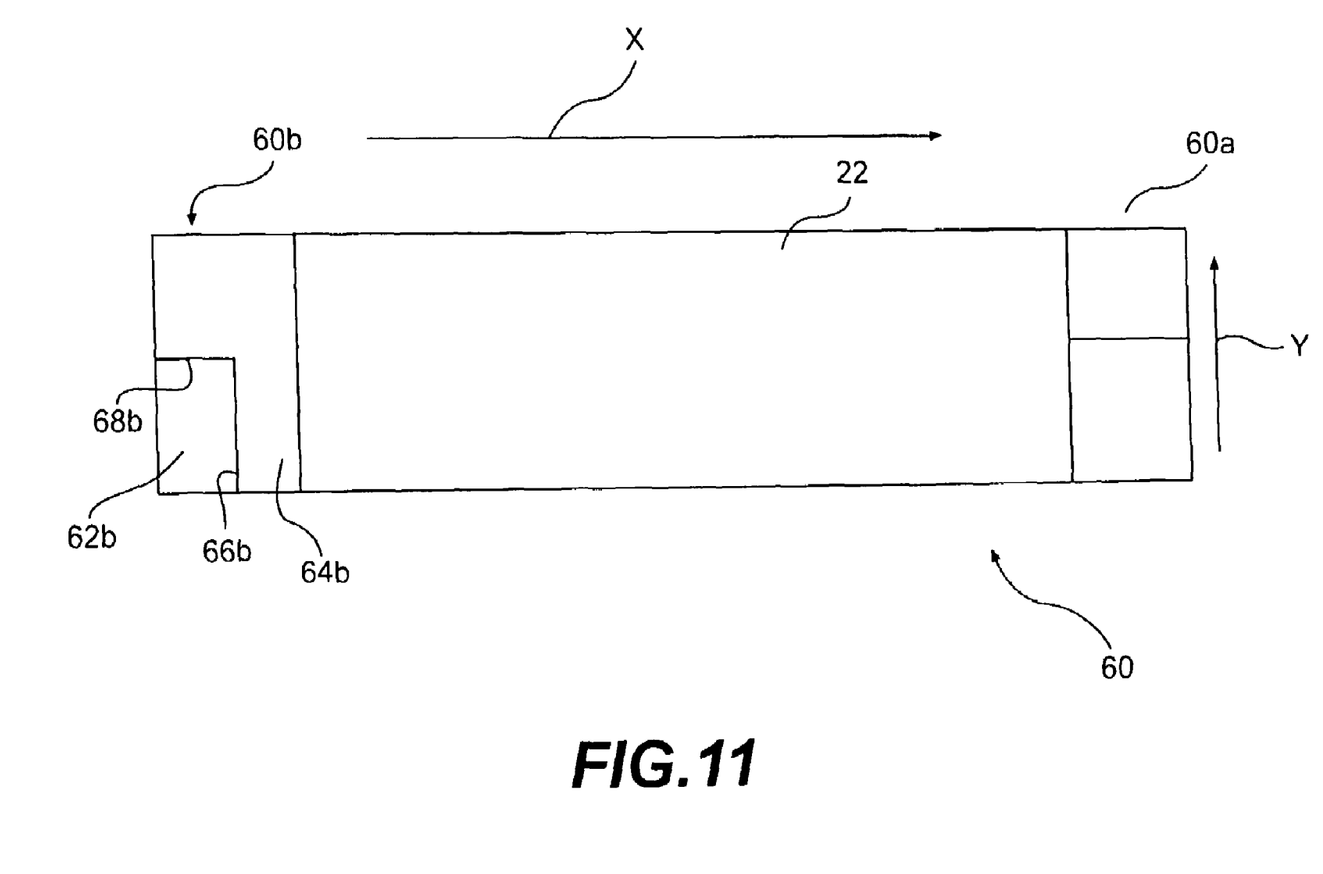
FIG. 11 is a plan view of a third embodiment of the scanning lens of the present invention.

A third embodiment is shown with reference to FIG. 11, which shows a plan view of a scanning lens 60. An end part 60b has a surface 64b (first surface) facing optical direction Z and a surface 62b (second surface) also facing optical direction Z. A height of surface 62b in optical direction Z is different from that of surface 64b. Thus, a side wall 66b, facing main-scanning direction X, and a side wall 68b, facing sub-scanning direction Y, are formed. In other words, a boundary between surfaces 62b and 64b creates an elevational difference that extends in optical-axis direction Z and main-scanning direction X, thereby resulting in an L-shaped structure.

When both side walls 66b and 68b are placed in contact with surfaces of a positioning rib or other components fixed to the bottom of optical box 118, scanning lens 60 can be positioned both in main-scanning direction X and in sub-scanning direction Y without the need for including projection 23.

As a result, it takes less time to position and fix scanning lens 60, which makes optical scanning device 10 more easily assembled and less expensive.

Since positioning takes less time, the cost of assembling a scanning unit can be reduced.

The modifications shown in other embodiments are also applicable to this embodiment.

In the present invention, a scanning lens includes a so-called pre-deflection lens or cylindrical lens on which a scanned light beam is incident. Further, the present invention applies to another scanning lens disclosed in U.S. patent application Ser. No. 20040130800, which is incorporated by reference in this application, as indicated above.

For purposes of this invention, it is noted that several embodiments of protrusions and indentation have been described for the first and second end parts of the lens part. A protrusion or an indentation presents an elevational difference with respect to the surface of the end part that defines the elevational difference. The elevational difference facilitates positioning of the scanning lens.

Numerous modifications of the present invention are possible in light of the above teachings. It is therefore to be understood that, within the scope of the appended claims, the present invention can be practiced in a manner other than as specifically described herein. When a certain effect can be accomplished without some elements shown in this embodiment, such elements can be omitted.

What is claimed is:

1. A one piece scanning lens, integrally molded from resin, comprising:
    a lens part, defining an optical axis, constructed to refract a light beam scanned in a first direction along a long length of the scanning lens orthogonal to the optical axis;
    a first end part, having a different curvature from the lens part, disposed at one end of the lens part in the first direction while being outside the lens part; and
    a surface, defined by the first end part, varying in elevation in a second direction, orthogonal to both the first direction and the optical axis, establishing an elevation difference near the approximate middle of the scanning lens in the second direction, the elevation difference facilitating positioning of the scanning lens in the second direction.

2. The scanning lens according to claim 1, wherein the elevation difference comprises a projection projecting from the surface of the first end part.

3. The scanning lens according to claim 2, wherein the projection has a partially cylindrical shape.

4. The scanning lens according to claim 2, wherein the projection is shaped as a rectangular solid.

5. The scanning lens according to claim 2, wherein the projection projects outwardly along the optical axis from the surface of the first end part.

6. The scanning lens according to claim 2, wherein the projection extends in the first direction along the surface of the first end part.

7. The scanning lens according to claim 1, wherein the elevation difference comprises an indentation into the surface of the first end part.

8. The scanning lens according to claim 7, wherein the indentation has a partially spherical shape.

9. The scanning lens according to claim 7, wherein the indentation extends into the surface along the optical axis.

10. The scanning lens according to claim 7, wherein the indentation extends along the first direction.

11. The scanning lens according to claim 7, wherein the indentation forms a groove on the surface.

12. The scanning lens according to claim 7, wherein the indentation forms a groove on the surface that extends in the first direction.

13. The scanning lens according to claim 1, wherein the elevation difference comprises:
    a first surface orthogonal to the optical axis; and
    a second surface orthogonal to the optical axis, disposed adjacent to the first surface,
    wherein the elevation difference is established by the juxtaposition of the first and second surfaces to one another at differing elevations.

14. The scanning lens according to claim 13, further comprising: a boundary between the first and second surfaces that extends in the first direction.

15. The scanning lens according to claim 14, wherein the boundary comprises a wall disposed parallel to the optical axis that extends between the first and second surfaces.

16. The scanning lens according to claim 1, further comprising:
    a second end part disposed at another end of the lens part in the first direction; and
    a surface, defined by the second end part, varying in elevation in a second direction, orthogonal to both the first direction and the optical axis, establishing an elevation difference, the elevation difference facilitating positioning of the scanning lens in the second direction.

17. The scanning lens according to claim 16, wherein the elevation difference on the surface of the first end part comprises one of an indentation or a projection having a shape selected from one of either a cube or a part of a spherical surface, and the elevation difference on the surface of the second end part comprises one of either an indentation or a projection having a shape selected from one of either a rectangular solid or a partial surface of an ellipsoid.

18. The scanning lens according to claim 16, further comprising:
    a third end part disposed adjacent to the lens part in the second direction; and
    a surface defined by the third end part comprising an elevation difference in a direction orthogonal to the first direction,
    wherein the elevation difference facilitates positioning of the scanning lens in the first direction.

19. The scanning lens according to claim 1, wherein the scanning lens is molded from resin that flows though a mold in the first direction.

20. A method of positioning a scanning lens according to claim 1, comprising:
   aligning the elevation difference on the surface of the first end part with a complementary surface disposed in an optical box containing a scanning element to scan the light beam;
   positioning the elevation difference on the surface of the first end part adjacent to the complementary surface, thereby positioning the scanning lens in the second direction.

* * * * *